US012592831B2

(12) United States Patent (10) Patent No.: US 12,592,831 B2
Popat et al. (45) Date of Patent: Mar. 31, 2026

(54) EMAIL PROTECTION USING EMAIL SIGNATURES BASED ON SIGNING TOKENS

(71) Applicant: Dell Products L.P., Round Rock, TX (US)

(72) Inventors: Rajiv Popat, Kolkata (IN); Manav Ghosh, Bangalore (IN)

(73) Assignee: Dell Products L.P., Round Rock, TX (US)

( * ) Notice: Subject to any disclaimer, the term of this patent is extended or adjusted under 35 U.S.C. 154(b) by 231 days.

(21) Appl. No.: 18/423,867

(22) Filed: Jan. 26, 2024

(65) Prior Publication Data

US 2025/0247245 A1 Jul. 31, 2025

(51) Int. Cl.
*H04L 9/32* (2006.01)
(52) U.S. Cl.
CPC .......... *H04L 9/3247* (2013.01); *H04L 9/3213* (2013.01); *H04L 9/3242* (2013.01)
(58) Field of Classification Search
CPC ... H04L 9/3213; H04L 9/3239; H04L 9/3242; H04L 9/3247; H04L 2209/608
See application file for complete search history.

(56) References Cited

U.S. PATENT DOCUMENTS 11,777,721 B2 * 10/2023 So ........................... H04L 9/083
713/156
2007/0014429 A1 * 1/2007 He ........................ H04L 9/3236
382/100

2009/0106840 A1 * 4/2009 Dreymann ............ H04L 51/212
726/23
2010/0198712 A1 * 8/2010 Benisti ................... G06Q 30/04
713/176
2012/0066498 A1 * 3/2012 Engert .................... G06F 21/51
713/170
2018/0196950 A1 * 7/2018 Heyner .................. G06F 21/64
2019/0081787 A1 * 3/2019 Bayar ................. G06F 21/6218
(Continued)

OTHER PUBLICATIONS

Jain et al."Symmetric Encryption using Artificial Neural Network, Binary Tree Traversal, and Interleaving Salting" [Online], Aug. 30, 2022 [Retrieved on: Oct. 30, 2025],IJEAT vol. 11 Iss.6 , Retrieved from: < https://www.researchgate.net/profile/Atishay-Jain-26 > (Year: 2022).*

(Continued)

*Primary Examiner* — Eric W Shepperd
(74) *Attorney, Agent, or Firm* — Ryan, Mason & Lewis, LLP

(57) ABSTRACT

Techniques are provided for email protection using email signatures based on signing tokens. One method comprises obtaining a signed email from an email sender. The signed email comprises a second hash value generated using a source version of the signed email embedded with a signing token of the email sender. A data record stores a first hash value, based on the source version, and the second hash value. The second hash value is obtained from the signed email and compared to: (i) a copy of the second hash value obtained from the data record and/or (ii) a comparison value generated using a regenerated version of the source version embedded with the signing token of the email sender. A delivery of the signed email to an email recipient may be based on a result of the comparison.

20 Claims, 11 Drawing Sheets

1002 — OBTAIN A SIGNED EMAIL SENT BY AT LEAST ONE SENDING PROCESSING DEVICE OF AN EMAIL SENDER, WHEREIN THE SIGNED EMAIL IS BASED AT LEAST IN PART ON A SOURCE EMAIL, WHEREIN A FIRST HASH VALUE GENERATED USING THE SOURCE EMAIL IS USED AS A KEY TO AT LEAST ONE DATA RECORD, WHEREIN THE SIGNED EMAIL COMPRISES A SECOND HASH VALUE AS AN EMAIL SIGNATURE, AND WHEREIN THE SECOND HASH VALUE IS (I) GENERATED USING THE SOURCE EMAIL EMBEDDED WITH AT LEAST A PORTION OF A SIGNING TOKEN OF THE EMAIL SENDER AND (II) STORED IN THE AT LEAST ONE DATA RECORD

1004 — OBTAIN THE SECOND HASH VALUE FROM THE SIGNED EMAIL

1006 — COMPARE THE SECOND HASH VALUE OBTAINED FROM THE SIGNED EMAIL TO ONE OR MORE OF: (I) A COPY OF THE SECOND HASH VALUE OBTAINED FROM THE AT LEAST ONE DATA RECORD AND (II) A COMPARISON VALUE DETERMINED USING A REGENERATED VERSION OF THE SOURCE EMAIL EMBEDDED WITH THE AT LEAST THE PORTION OF THE SIGNING TOKEN OF THE EMAIL SENDER

1008 — AUTOMATICALLY CONTROL A DELIVERY OF THE SIGNED EMAIL TO AT LEAST ONE EMAIL RECIPIENT BASED AT LEAST IN PART ON A RESULT OF THE COMPARISON

(56)     References Cited

U.S. PATENT DOCUMENTS

2021/0351932 A1* 11/2021 Gray ..................... H04L 9/0643
2023/0283478 A1*  9/2023 Osborn ................ H04L 9/0866
                                                    713/172
2025/0299169 A1*  9/2025 Kassemi ............. G06Q 20/384

OTHER PUBLICATIONS

"Overview Email Signing and Encryption"; https://www.identrust.
com/certificates/learn/overview-email-signing-and-encryption; down-
loaded on Jan. 24, 2024.
"Creating the Email Authentication Code"; https://developers.
bazaarvoice.com/v1.0-NotificationsAPI/docs/creating-the-email-
authentication-token; downloaded on Jan. 24, 2024.
"Secure Messages by Using a Digital Signature"; https://support.
microsoft.com/en-us/office/secure-messages-by-using-a-digital-
signature-549ca2f1-a68f-4366-85fa-b3f4b5856fc6; downloaded on
Jan. 24, 2024.
Poddar, Rishabh; "Implementing the Right Email Verification Flow";
https://supertokens.com/blog/implementing-the-right-email-verification-
flow; dated Feb. 24, 2023.

* cited by examiner

Figure 5:
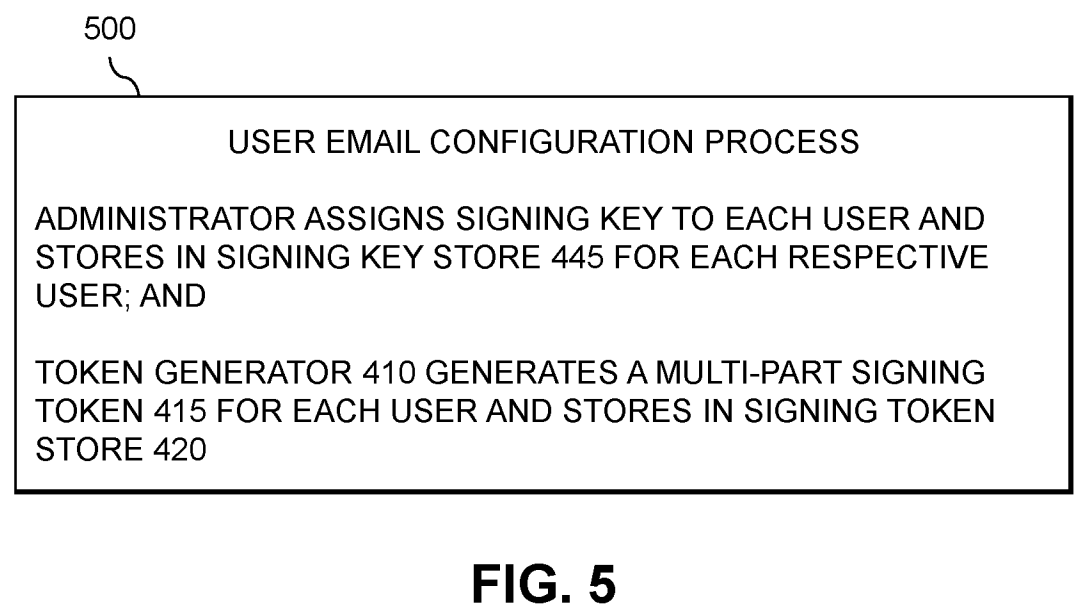

500

USER EMAIL CONFIGURATION PROCESS

ADMINISTRATOR ASSIGNS SIGNING KEY TO EACH USER AND STORES IN SIGNING KEY STORE 445 FOR EACH RESPECTIVE USER; AND

TOKEN GENERATOR 410 GENERATES A MULTI-PART SIGNING TOKEN 415 FOR EACH USER AND STORES IN SIGNING TOKEN STORE 420

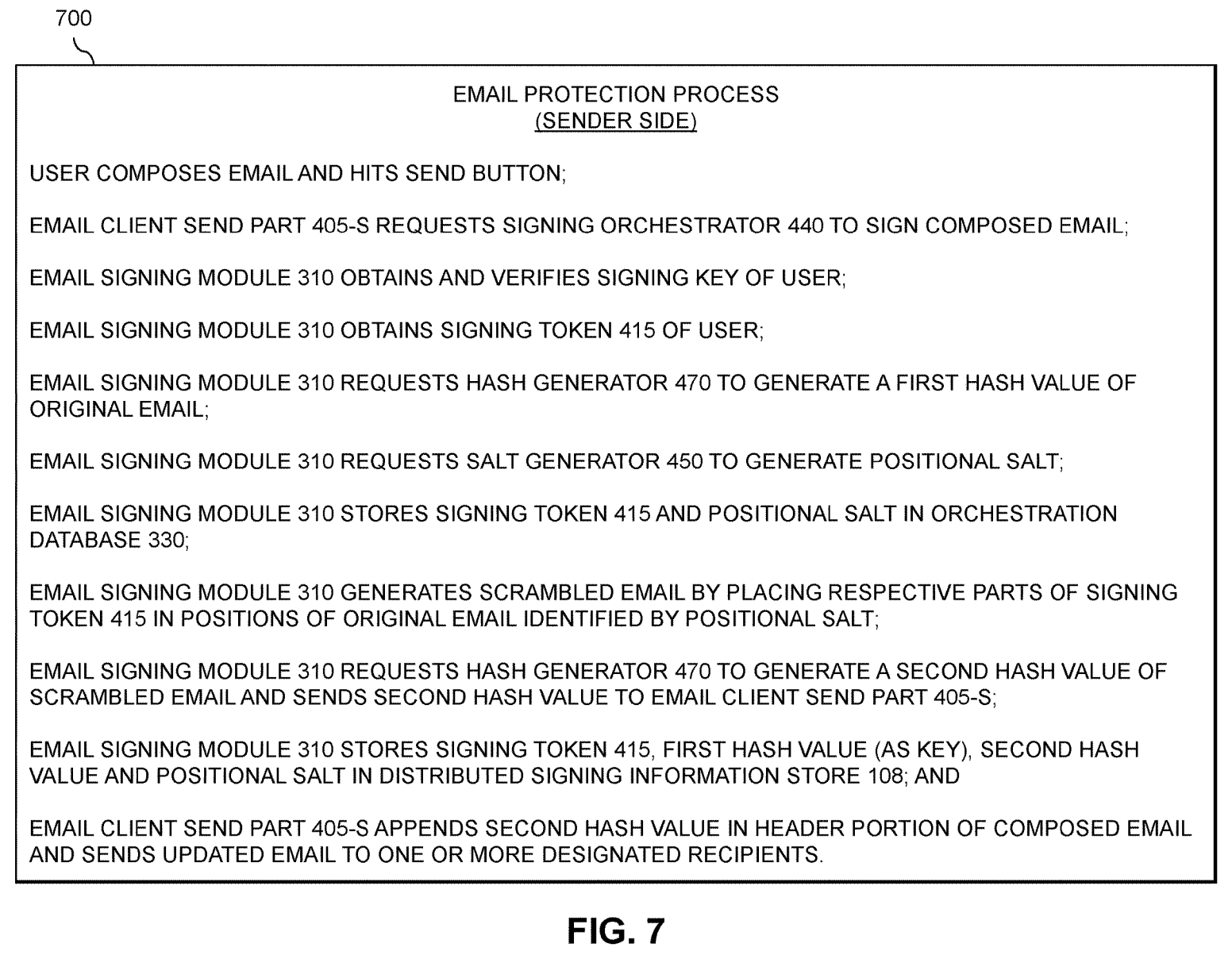

EMAIL PROTECTION PROCESS
(SENDER SIDE)

USER COMPOSES EMAIL AND HITS SEND BUTTON;

EMAIL CLIENT SEND PART 405-S REQUESTS SIGNING ORCHESTRATOR 440 TO SIGN COMPOSED EMAIL;

EMAIL SIGNING MODULE 310 OBTAINS AND VERIFIES SIGNING KEY OF USER;

EMAIL SIGNING MODULE 310 OBTAINS SIGNING TOKEN 415 OF USER;

EMAIL SIGNING MODULE 310 REQUESTS HASH GENERATOR 470 TO GENERATE A FIRST HASH VALUE OF ORIGINAL EMAIL;

EMAIL SIGNING MODULE 310 REQUESTS SALT GENERATOR 450 TO GENERATE POSITIONAL SALT;

EMAIL SIGNING MODULE 310 STORES SIGNING TOKEN 415 AND POSITIONAL SALT IN ORCHESTRATION DATABASE 330;

EMAIL SIGNING MODULE 310 GENERATES SCRAMBLED EMAIL BY PLACING RESPECTIVE PARTS OF SIGNING TOKEN 415 IN POSITIONS OF ORIGINAL EMAIL IDENTIFIED BY POSITIONAL SALT;

EMAIL SIGNING MODULE 310 REQUESTS HASH GENERATOR 470 TO GENERATE A SECOND HASH VALUE OF SCRAMBLED EMAIL AND SENDS SECOND HASH VALUE TO EMAIL CLIENT SEND PART 405-S;

EMAIL SIGNING MODULE 310 STORES SIGNING TOKEN 415, FIRST HASH VALUE (AS KEY), SECOND HASH VALUE AND POSITIONAL SALT IN DISTRIBUTED SIGNING INFORMATION STORE 108; AND

EMAIL CLIENT SEND PART 405-S APPENDS SECOND HASH VALUE IN HEADER PORTION OF COMPOSED EMAIL AND SENDS UPDATED EMAIL TO ONE OR MORE DESIGNATED RECIPIENTS.

FIG. 7

Figure 9:
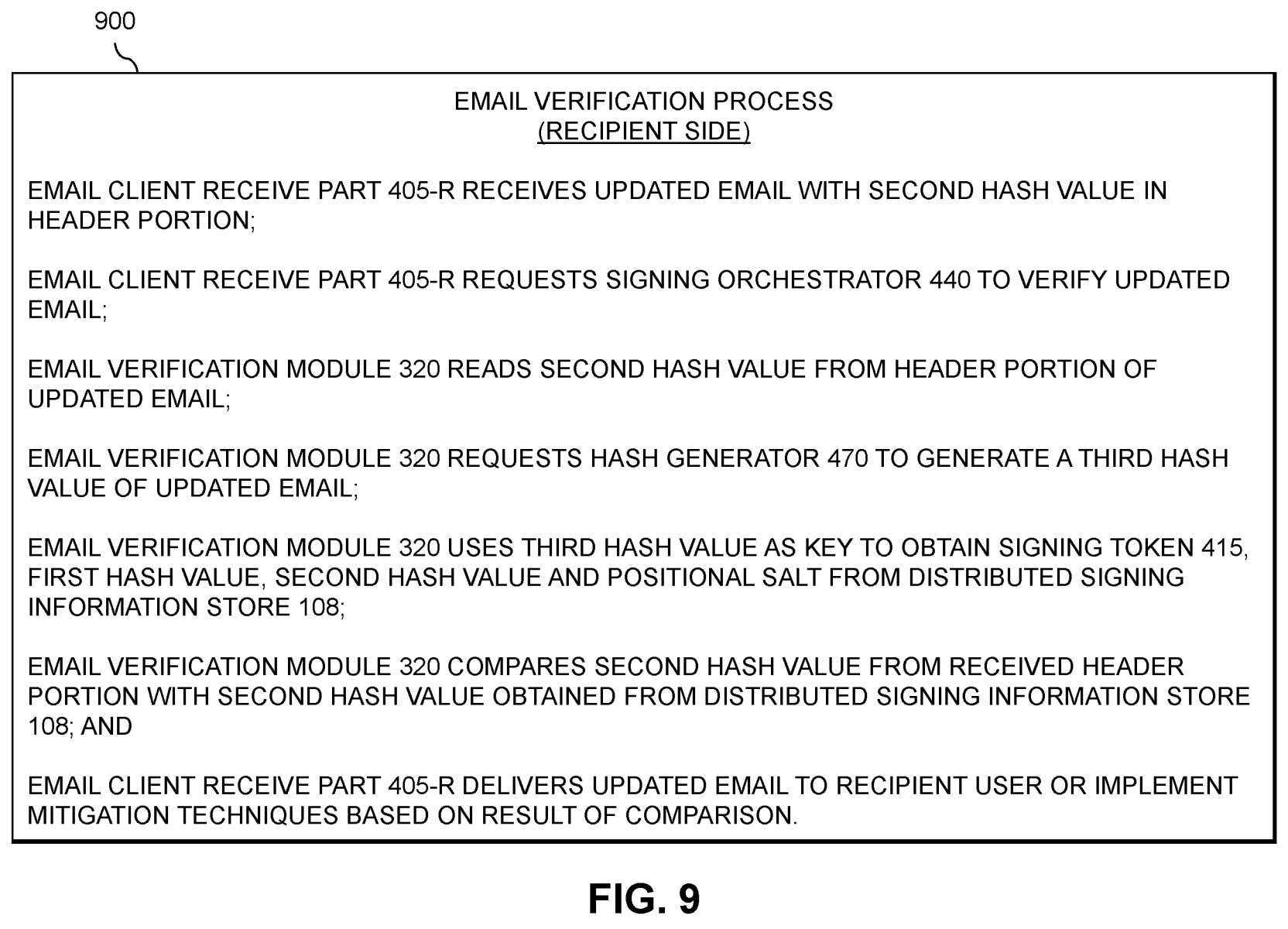

EMAIL VERIFICATION PROCESS
(RECIPIENT SIDE)

EMAIL CLIENT RECEIVE PART 405-R RECEIVES UPDATED EMAIL WITH SECOND HASH VALUE IN HEADER PORTION;

EMAIL CLIENT RECEIVE PART 405-R REQUESTS SIGNING ORCHESTRATOR 440 TO VERIFY UPDATED EMAIL;

EMAIL VERIFICATION MODULE 320 READS SECOND HASH VALUE FROM HEADER PORTION OF UPDATED EMAIL;

EMAIL VERIFICATION MODULE 320 REQUESTS HASH GENERATOR 470 TO GENERATE A THIRD HASH VALUE OF UPDATED EMAIL;

EMAIL VERIFICATION MODULE 320 USES THIRD HASH VALUE AS KEY TO OBTAIN SIGNING TOKEN 415, FIRST HASH VALUE, SECOND HASH VALUE AND POSITIONAL SALT FROM DISTRIBUTED SIGNING INFORMATION STORE 108;

EMAIL VERIFICATION MODULE 320 COMPARES SECOND HASH VALUE FROM RECEIVED HEADER PORTION WITH SECOND HASH VALUE OBTAINED FROM DISTRIBUTED SIGNING INFORMATION STORE 108; AND

EMAIL CLIENT RECEIVE PART 405-R DELIVERS UPDATED EMAIL TO RECIPIENT USER OR IMPLEMENT MITIGATION TECHNIQUES BASED ON RESULT OF COMPARISON.

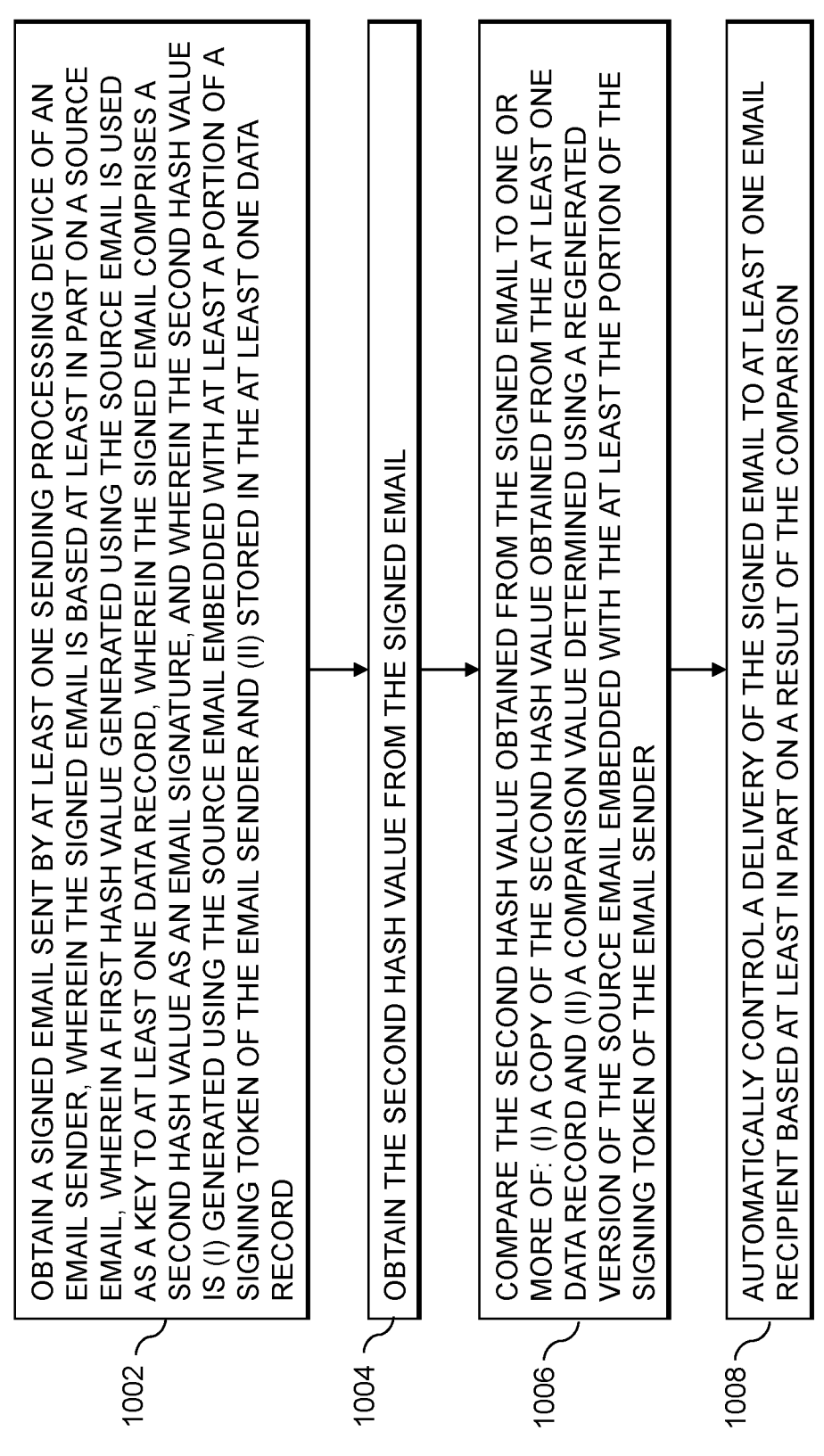

1002   OBTAIN A SIGNED EMAIL SENT BY AT LEAST ONE SENDING PROCESSING DEVICE OF AN EMAIL SENDER, WHEREIN THE SIGNED EMAIL IS BASED AT LEAST IN PART ON A SOURCE EMAIL, WHEREIN A FIRST HASH VALUE GENERATED USING THE SOURCE EMAIL IS USED AS A KEY TO AT LEAST ONE DATA RECORD, WHEREIN THE SIGNED EMAIL COMPRISES A SECOND HASH VALUE AS AN EMAIL SIGNATURE, AND WHEREIN THE SECOND HASH VALUE IS (I) GENERATED USING THE SOURCE EMAIL EMBEDDED WITH AT LEAST A PORTION OF A SIGNING TOKEN OF THE EMAIL SENDER AND (II) STORED IN THE AT LEAST ONE DATA RECORD

1004   OBTAIN THE SECOND HASH VALUE FROM THE SIGNED EMAIL

1006   COMPARE THE SECOND HASH VALUE OBTAINED FROM THE SIGNED EMAIL TO ONE OR MORE OF: (I) A COPY OF THE SECOND HASH VALUE OBTAINED FROM THE AT LEAST ONE DATA RECORD AND (II) A COMPARISON VALUE DETERMINED USING A REGENERATED VERSION OF THE SOURCE EMAIL EMBEDDED WITH THE AT LEAST THE PORTION OF THE SIGNING TOKEN OF THE EMAIL SENDER

1008   AUTOMATICALLY CONTROL A DELIVERY OF THE SIGNED EMAIL TO AT LEAST ONE EMAIL RECIPIENT BASED AT LEAST IN PART ON A RESULT OF THE COMPARISON

FIG. 10

EMAIL PROTECTION USING EMAIL SIGNATURES BASED ON SIGNING TOKENS

BACKGROUND

Electronic mail (or "email") has become a primary method of communication. As the volume of email has increased, the cybersecurity threats associated with such emails have become more apparent. Email may be intercepted by unauthorized recipients, for example, and the contents of the email may be exposed. In addition, with an email spoofing attack, an attacker creates an email address resembling that of a trusted email sender by altering the "from" field of the email to indicate an email address that looks similar to the email address of the trusted email sender. With a phishing attack, an attacker attempts to steal sensitive information of the recipient, such as credentials or personal information of the recipient. Email protection techniques exist, such as those that employ Public Key Infrastructure (PKI)-based digital certificates to encrypt emails. Nonetheless, a large number of emails continue to be sent without encryption or other protection.

SUMMARY

Illustrative embodiments of the disclosure provide techniques for email protection using email signatures based on signing tokens. An exemplary method comprises obtaining a signed email sent by at least one sending processing device of an email sender, wherein the signed email is based at least in part on a source email, wherein a first hash value generated using the source email is used as a key to at least one data record, wherein the signed email comprises a second hash value as an email signature, and wherein the second hash value is (i) generated using the source email embedded with at least a portion of a signing token of the email sender and (ii) stored in the at least one data record; obtaining the second hash value from the signed email; comparing the second hash value obtained from the signed email to one or more of: (i) a copy of the second hash value obtained from the at least one data record and (ii) a comparison value determined using a regenerated version of the source email embedded with the at least the portion of the signing token of the email sender; and automatically controlling a delivery of the signed email to at least one email recipient based at least in part on a result of the comparison.

Illustrative embodiments can provide significant advantages relative to conventional techniques for protecting email. For example, problems associated with time-consuming and complex email protection techniques are overcome in one or more embodiments by verifying the identity of email senders and the authenticity of such emails using email signatures based on signing tokens.

These and other illustrative embodiments include, without limitation, methods, apparatus, networks, systems and processor-readable storage media.

BRIEF DESCRIPTION OF THE DRAWINGS

FIG. 5 is a process diagram illustrating an exemplary implementation of a user email configuration process in an illustrative embodiment;

FIG. 7 is a process diagram illustrating an exemplary implementation of an email protection process performed for an email that is being sent in an illustrative embodiment;

FIG. 9 is a process diagram illustrating an exemplary implementation of an email verification process for processing a received email in an illustrative embodiment;

FIG. 10 is a flow diagram illustrating an exemplary implementation of a process for email protection using email signatures based on signing tokens, according to an embodiment.

DETAILED DESCRIPTION

Illustrative embodiments will be described herein with reference to exemplary information processing systems and associated computers, servers, storage devices and other processing devices. It is to be appreciated, however, that embodiments are not restricted to use with the particular illustrative system and device configurations shown. Accordingly, the term "information processing system" as used herein is intended to be broadly construed, so as to encompass, for example, processing systems comprising cloud computing and storage systems, as well as other types of processing systems comprising various combinations of physical and virtual processing resources. An information processing system may therefore comprise, for example, at least one data center or other type of cloud-based system that includes one or more clouds hosting tenants that access cloud resources.

Email phishing and/or email spoofing attacks present significant cybersecurity threats associated with the use of emails as a primary communication method. As noted above, with an email spoofing attack, an attacker creates an email address resembling that of a trusted email sender by altering the "from" field of the email to indicate an email address that may look like it was sent by a trusted email sender. With a phishing attack, an attacker attempts to steal sensitive information of the recipient, such as credentials or personal information of the recipient.

In one or more embodiments, the disclosed techniques for email protection using email signatures based on signing tokens permit the senders of received emails to be verified and also verify the authenticity of emails (e.g., that the email content has not been tampered with).

Figure 1:
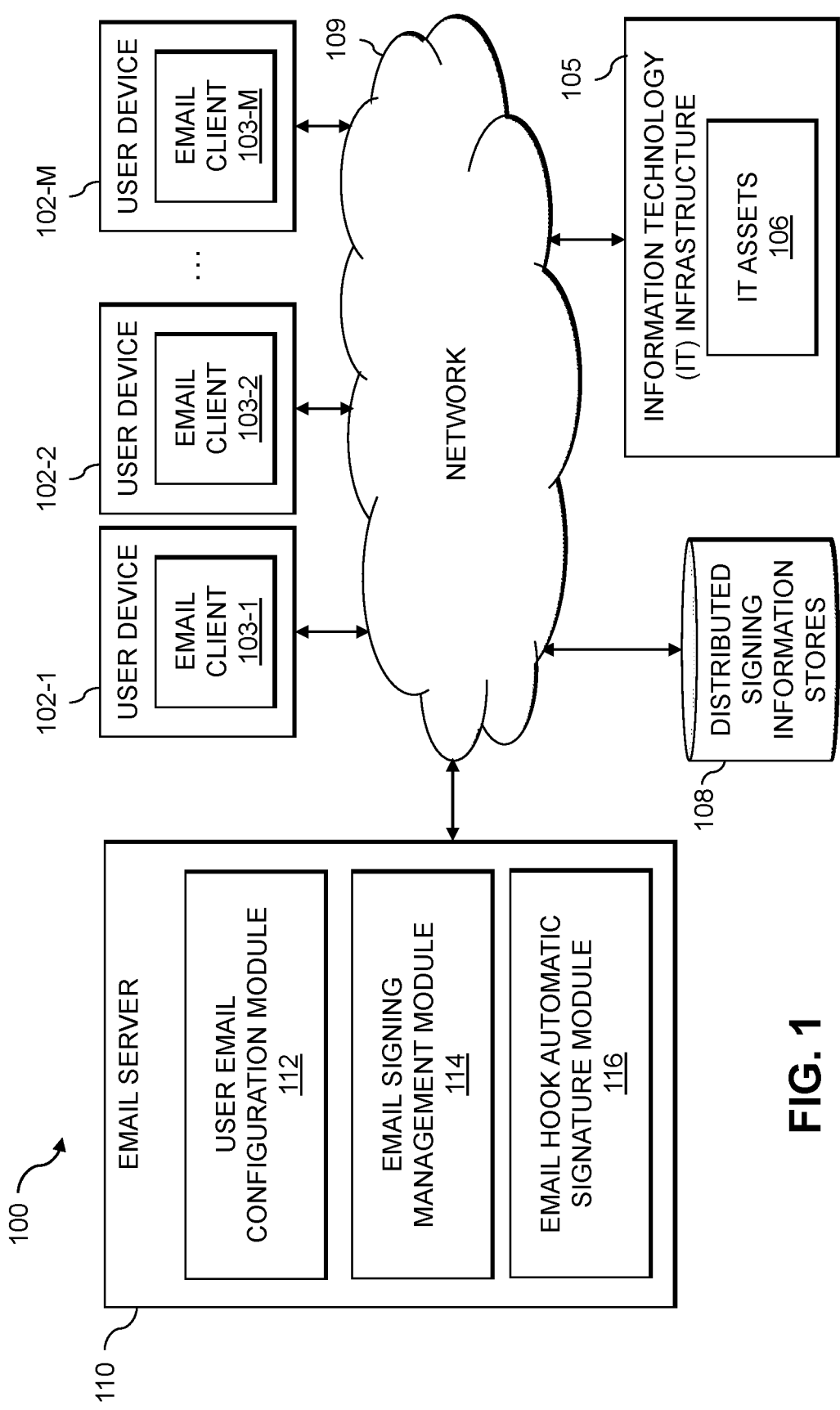
FIG. 1 is a block diagram of an information processing system configured for email protection using email signatures based on signing tokens in an illustrative embodiment.

FIG. 1 shows an information processing system 100 configured in accordance with an illustrative embodiment. The information processing system 100 is assumed to be built on at least one processing platform and provides functionality for email protection using email signatures based on signing tokens. The information processing system 100 includes a set of user devices 102-1, 102-2, . . . 102-M (collectively, user devices 102) which are coupled to a network 109. Also coupled to the network 109 is an information technology (IT) infrastructure 105 comprising one or more IT assets 106, one or more distributed signing information stores 108, and an email server 110. The IT assets 106 may comprise physical and/or virtual computing resources in the IT infrastructure 105. Physical computing resources may include physical hardware such as servers, host devices, storage systems, networking equipment, Internet of Things (IoT) devices, other types of processing and computing devices including desktops, laptops, tablets, smartphones, etc. Virtual computing resources may include virtual machines (VMs), containers, etc.

The IT assets 106 of the IT infrastructure 105 may host software applications that are utilized by respective ones of the user devices 102, such as in accordance with a client-server computer program architecture. In some embodiments, the software applications comprise web applications designed for delivery from assets in the IT infrastructure 105 to users (e.g., of user devices 102) over the network 109. Various other examples are possible, such as where one or more software applications are used internal to the IT infrastructure 105 and not exposed to the user devices 102. It should be appreciated that, in some embodiments, some of the IT assets 106 of the IT infrastructure 105 may themselves be viewed as applications or more generally as software or hardware.

The user devices 102 may comprise, for example, physical computing devices such as IoT devices, mobile telephones, laptop computers, tablet computers, desktop computers or other types of devices utilized by members of an enterprise, in any combination. Such devices are examples of what are more generally referred to herein as "processing devices." Some of these processing devices are also generally referred to herein as "computers." The user devices 102 may also or alternately comprise virtualized computing resources, such as VMs, containers, etc.

The user devices 102 in some embodiments comprise respective computers associated with a particular company, organization or other enterprise. Thus, the user devices 102 may be considered examples of assets of an enterprise system. In addition, at least portions of the information processing system 100 may also be referred to herein as collectively comprising one or more "enterprises." Numerous other operating scenarios involving a wide variety of different types and arrangements of processing nodes are possible, as will be appreciated by those skilled in the art.

As shown in FIG. 1, the user devices 102 comprise respective email clients 103-1 through 103-M (collectively, email clients 103), as discussed further below in conjunction with FIG. 4, for example.

The network 109 is assumed to comprise a global computer network such as the Internet, although other types of networks can be part of the network 109, including a wide area network (WAN), a local area network (LAN), a satellite network, a telephone or cable network, a cellular network, a wireless network such as a WiFi or WiMAX network, or various portions or combinations of these and other types of networks.

Although not explicitly shown in FIG. 1, one or more input-output devices such as keyboards, displays or other types of input-output devices may be used to support one or more user interfaces to the email server 110, as well as to support communication between the email server 110 and other related systems and devices not explicitly shown.

The user devices 102 are configured to access or otherwise utilize the IT infrastructure 105. In some embodiments, the user devices 102 are assumed to be associated with users that execute one or more software applications. In other embodiments, the user devices 102 are assumed to be associated with system administrators, IT managers or other authorized personnel responsible for managing the IT assets 106 of the IT infrastructure 105 (e.g., where such management includes configuring email accounts of one or more users). For example, a given one of the user devices 102 may be operated by a user to access a graphical user interface (GUI) provided by the email server 110 to manage signing keys and/or signing tokens, as discussed further below in conjunction with FIG. 5, for example. The email server 110 may be provided as a cloud service that is accessible by the given user device 102 to allow the user thereof to send and receive email in accordance with the disclosed email protection techniques.

In some embodiments, the IT assets 106 of the IT infrastructure 105 are owned or operated by the same enterprise that operates the email server 110 (e.g., where an enterprise such as a business provides support for the assets it operates). In other embodiments, the IT assets 106 of the IT infrastructure 105 may be owned or operated by one or more enterprises different than the enterprise which operates the email server 110 (e.g., a first enterprise provides support for assets that are owned by multiple different customers, business, etc.). Various other examples are possible.

In some embodiments, the user devices 102 may implement host agents that are configured for automated transmission of information regarding a state of the email clients 103 of the user devices 102 (e.g., such as in the form of email logs and/or notifications of emails that failed the verification portion of the disclosed email protection techniques). Such host agents may also or alternatively be configured to automatically receive from the email server 110 commands to execute remote actions (e.g., to update user information, such as signing keys and signing tokens). Host agents may similarly be deployed on the IT assets 106 of the IT infrastructure 105.

It should be noted that a "host agent" as this term is generally used herein may comprise an automated entity, such as a software entity running on a processing device. Accordingly, a host agent need not be a human entity.

The email server 110 in the FIG. 1 embodiment is assumed to be implemented using at least one processing device. Each such processing device generally comprises at least one processor and an associated memory, and implements one or more functional modules or logic for controlling certain features of the email server 110. In the FIG. 1 embodiment, the email server 110 comprises a user email configuration module 112, an email signing management module 114 and an optional email hook automatic signature module 116. The user email configuration module 112 is configured to manage the email accounts of various users of the user devices 102, maintain configuration information for such email accounts and users and to provide email logs and other information related to such email accounts to one or more users of the user devices 102. The email signing management module 114, discussed further below in conjunction with FIGS. 2 and 4, for example, is configured to implement at least portions of the disclosed email protection techniques. The email hook automatic signature module 116 is configured in some embodiments to implement automated signing of emails so that a user does not need to enter a signing key each time an email is sent.

The email signing management module 114, or portions thereof, is further configured to store and/or access various information stored in the distributed signing information stores 108. For example, for each email sent using the disclosed email protection techniques, the following representative information may be stored in the distributed signing information stores 108: a signing token, a first hash value (as a key), a second hash and positional salt values, as discussed further below in conjunction with FIGS. 6 and 7. Likewise, for each email received using the disclosed email protection techniques, the following representative information may be obtained from the distributed signing information stores 108: the signing token, the first hash value (as a key), the second hash and the positional salt values, as discussed further below in conjunction with FIGS. 8 and 9.

In some embodiments, one or more of the storage systems utilized to implement the distributed signing information stores 108 comprise a scale-out all-flash content addressable storage array or other type of storage array.

The term "storage system" as used herein is therefore intended to be broadly construed and should not be viewed as being limited to content addressable storage systems or flash-based storage systems. A given storage system as the term is broadly used herein can comprise, for example, network-attached storage (NAS), storage area networks (SANs), direct-attached storage (DAS) and distributed DAS, as well as combinations of these and other storage types, including software-defined storage.

Other particular types of storage products that can be used in implementing storage systems in illustrative embodiments include all-flash and hybrid flash storage arrays, software-defined storage products, cloud storage products, object-based storage products, and scale-out NAS clusters. Combinations of multiple ones of these and other storage products can also be used in implementing a given storage system in an illustrative embodiment.

An enterprise may subscribe to or otherwise utilize the email server 110 to automatically implement the disclosed email protection techniques. As used herein, the term "enterprise system" is intended to be construed broadly to encompass any group of systems or other computing devices. For example, the IT assets 106 of the IT infrastructure 105 may provide a portion of one or more enterprise systems. A given enterprise system may also or alternatively include one or more of the user devices 102. In some embodiments, an enterprise system includes one or more data centers, cloud infrastructure comprising one or more clouds, etc. A given enterprise system, such as cloud infrastructure, may host assets that are associated with multiple enterprises (e.g., two or more different businesses, organizations or other entities).

It is to be appreciated that the particular arrangement of the user devices 102, the IT infrastructure 105 and the email server 110 illustrated in the FIG. 1 embodiment is presented by way of example only, and alternative arrangements can be used in other embodiments. As discussed above, for example, the email server 110 (or portions of components thereof, such as one or more of the user email configuration module 112, the email signing management module 114 and the email hook automatic signature module 116) may in some embodiments be implemented internal to one or more of the user devices 102 and/or the IT infrastructure 105.

At least portions of the user email configuration module 112, the email signing management module 114 and the email hook automatic signature module 116 may be implemented at least in part in the form of software that is stored in memory and executed by a processor.

The email server 110 and other portions of the information processing system 100, as will be described in further detail below, may be part of cloud infrastructure.

The email server 110 and other components of the information processing system 100 in the FIG. 1 embodiment are assumed to be implemented using at least one processing platform comprising one or more processing devices each having a processor coupled to a memory. Such processing devices can illustratively include particular arrangements of compute, storage and network resources.

The user devices 102, IT infrastructure 105, the distributed signing information stores 108 and the email server 110 or components thereof (e.g., the user email configuration module 112, the email signing management module 114 and the email hook automatic signature module 116) may be implemented on respective distinct processing platforms, although numerous other arrangements are possible. For example, in some embodiments at least portions of the email server 110 and one or more of the user devices 102, the IT infrastructure 105 and/or the distributed signing information stores 108 are implemented on the same processing platform. A given client device (e.g., user device 102-1) can therefore be implemented at least in part within at least one processing platform that implements at least a portion of the email server 110.

The term "processing platform" as used herein is intended to be broadly construed so as to encompass, by way of illustration and without limitation, multiple sets of processing devices and associated storage systems that are configured to communicate over one or more networks. For example, distributed implementations of the information processing system 100 are possible, in which certain components of the system reside in one data center in a first geographic location while other components of the system reside in one or more other data centers in one or more other geographic locations that are potentially remote from the first geographic location. Thus, it is possible in some implementations of the information processing system 100 for the user devices 102, the IT infrastructure 105, IT assets 106, the distributed signing information stores 108 and the email server 110, or portions or components thereof, to reside in different data centers. Numerous other distributed implementations are possible. The email server 110 can also be implemented in a distributed manner across multiple data centers.

Additional examples of processing platforms utilized to implement the email server 110 and other components of the information processing system 100 in illustrative embodiments will be described in more detail below in conjunction with FIGS. 11 and 12.

It is to be appreciated that these and other features of illustrative embodiments are presented by way of example only and should not be construed as limiting in any way.

It is to be understood that the particular set of elements shown in FIG. 1 for email protection using email signatures based on signing tokens is presented by way of illustrative example only, and in other embodiments additional or alternative elements may be used. Thus, another embodiment may include additional or alternative systems, devices and other network entities, as well as different arrangements of modules and other components.

It is to be appreciated that these and other features of illustrative embodiments are presented by way of example only and should not be construed as limiting in any way.

Figure 2:
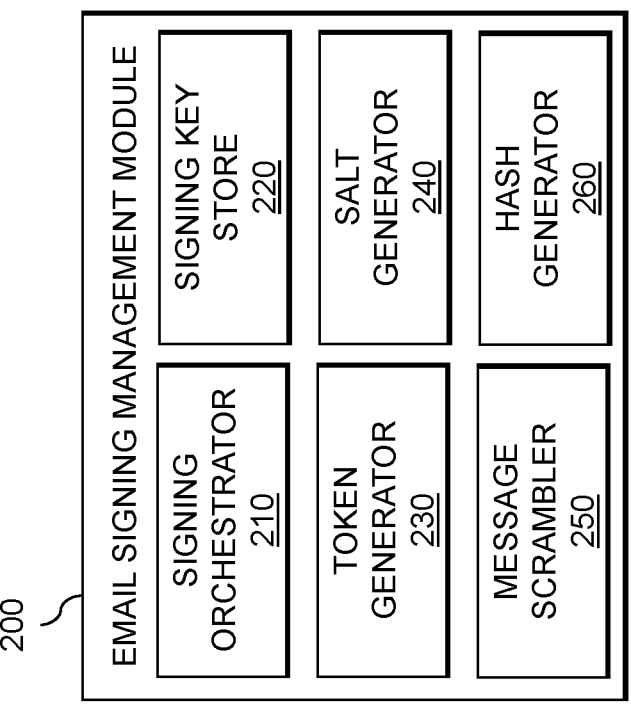
FIG. 2 illustrates an example of the email signing management module of FIG. 1 in further detail in an illustrative embodiment.

FIG. 2 illustrates an exemplary email signing management module 200 in an illustrative embodiment. The email signing management module 114 of FIG. 1 may be implemented, at least in part, using the email signing management module 200 of FIG. 2. In the example of FIG. 2, the email signing management module 200 comprises a signing orchestrator 210, a signing key store 220, a token generator 230, a salt generator 240, a message scrambler 250 and a hash generator 260, as discussed further below in conjunction with FIG. 4, for example. The signing key store 220 may store one signing key for each user, for example.

Figure 3:
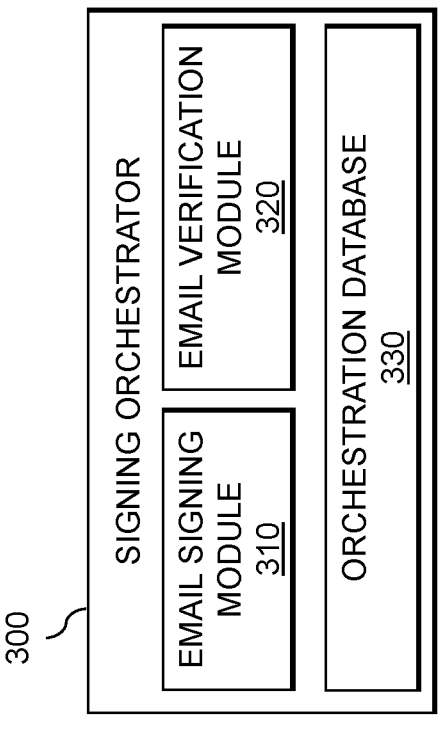
FIG. 3 illustrates an example of the signing orchestrator of FIG. 2 in further detail in an illustrative embodiment.

FIG. 3 illustrates an exemplary signing orchestrator 300 in an illustrative embodiment. The signing orchestrator 210 of FIG. 2 may be implemented, at least in part, using the signing orchestrator 300 of FIG. 3. In the example of FIG. 3, the signing orchestrator 300 comprises an email signing module 310, an email verification module 320 and an orchestration database 330. The functionality of the email signing module 310 will be discussed further below in conjunction with FIGS. 6 and 7. The functionality of the email verification module 320 will be discussed further below in conjunction with FIGS. 8 and 9. The signing orchestrator 300, or portions thereof, store the signing token and the positional salt for a given email being sent in the orchestration database 330, as discussed further below in conjunction with FIG. 7, for example.

In some embodiments, as discussed further below in conjunction with FIGS. 6 and 7, for example, the email signing module 310 relies on multiple values:

(i) the email to be signed, which may comprise header elements, such as a sending timestamp, the body of the email, and the recipients of the email (typically all from an email plugin at the sender side). The email to be sent comprises the text that will have salt sprinkled over it before the salted email is hashed in accordance with the disclosed email protection techniques. A sample of the email text may be expressed as follows:

from: user1@abc.com
to: user2@abc.com
sent: 4 Sept. 2023, 4:00:00 PM.
Hello, how are you doing? This is a quick test to see if email signatures work.
Thanks,
User1;

(ii) a signing key of the email sender from the signing key store 220—the email signing module 310 validates the signing key, for example, in response to the user clicking on a sign button, to determine whether the user is allowed (e.g., authorized) to sign the message;

(iii) a signing token generated by the token generator 230 and the locational salt generated by the salt generator 240—once the signing key has been verified by the email signing module 310, the email signing module 310 obtains the signing token, breaks the multi-part token into its different parts, obtains different positions from the salt generator 240 and the message scrambler 250 inserts the different parts of the signing token in the generated positions of the email to generate a scrambled message; and (iv) a hash value (e.g., a non-reversible zero knowledge proof-based quantum safe hash value) of the scrambled message generated by a hash generator 260—the signing orchestrator 300 may generate a non-reversible zero knowledge proof-based quantum safe hash of the resulting message (e.g., a message-dependent hash value, for example, generated using a hash function, whereby if the message changes, the message-dependent hash value also changes).

A representative three-part signing token may be express as "AAA-BBB-CCC," where the three parts may or may not have the same character length. An example of the "AAA" part of the signing token may be a first hexadecimal value, such as 46cb80512e9d; an example of the "BBB" part of the signing token may be a second hexadecimal al value, such as c6ff41e2e4fb391105d0ae317a45; and an example of the "CCC" part of the signing token may be a third hexadecimal value, such as fa31fb1911629af38f89cb30. The generated positional salt may be, for example, 1, 10 and 83. Thus, the first part of the signing token (46cb80512e9d) may be placed in character 1 of the email, the second part of the signing token (c6ff41e2e4fb391105d0ae317a45) may be placed in character 10 of the email and the third part of the signing token (fa31fb1911629af38f89cb30) may be placed in character 83 of the email.

The scrambled message in the present example may be expressed as follows:

f{46cb80512e9d}rom:                           User {c6ff41e2e4fb391105d0ae317a45} 1@abc.com
to: user2@abc.com
sent: 4 Sept. 2023, 4:00:00 PM.
Hello, {fa31fb1911629af38f89cb30} how are you doing? This is a quick test to see if email signatures work.
Thanks,
User1

It is noted that the generated hash value cannot be regenerated or reconstructed from the original message itself because of the positional salt that was sprinkled on the original message before it was hashed. The act of generating the multi-part signing token and sprinkling the various parts of the multi-part signing token into the original email based on the email positions identified in the positional salt all happened as a part of the email signing by the email server 110 and the client does not have knowledge of this functionality or these values.

In some embodiments, as discussed further below in conjunction with FIGS. 8 and 9, for example, the email verification module 320 performs at least some of the functionality to verify emails protected in accordance with the disclosed email protection techniques.

Figure 4:
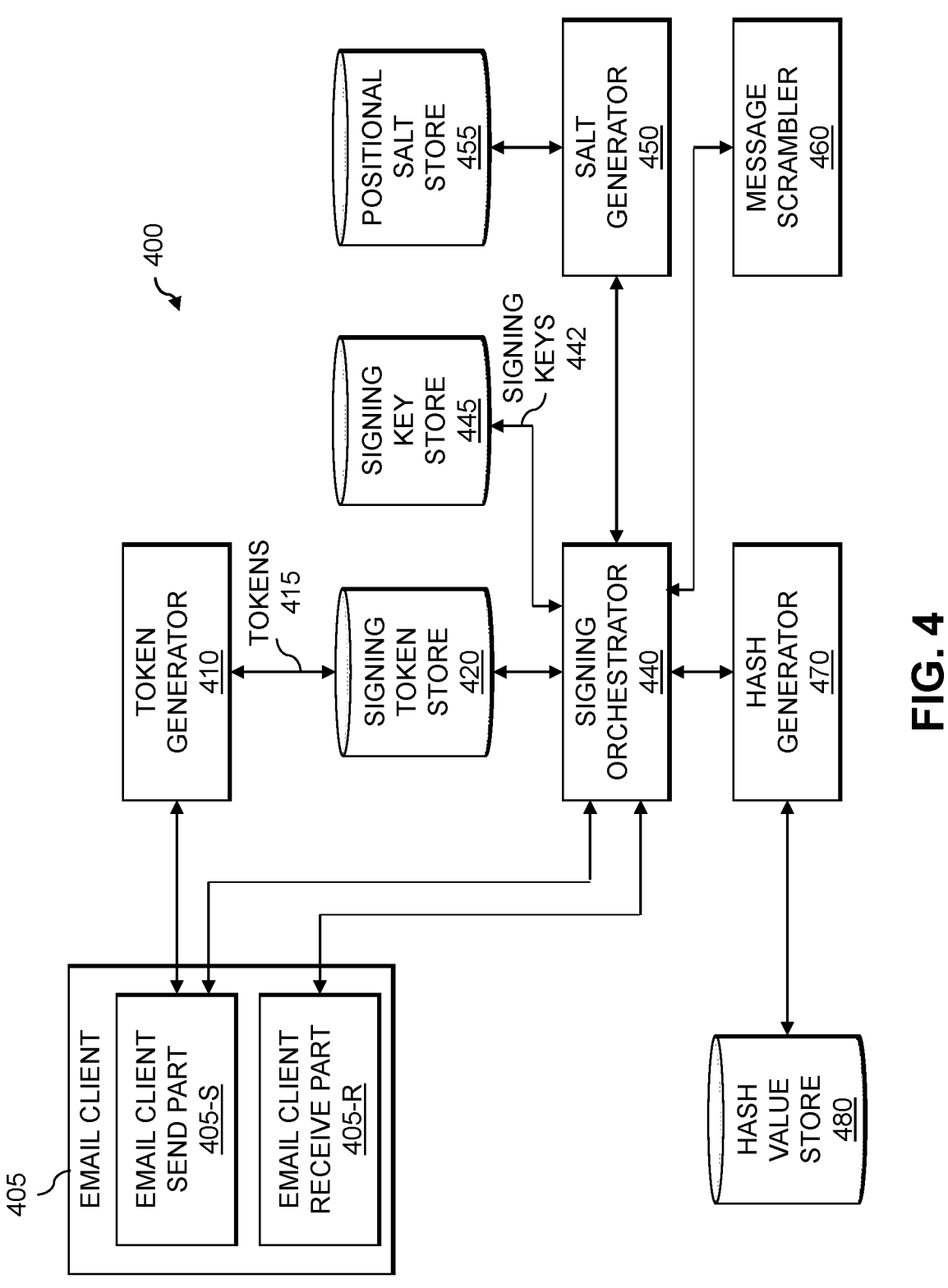
FIG. 4 illustrates an exemplary architecture of an information processing system configured for email protection using email signatures based on signing tokens in an illustrative embodiment.

FIG. 4 illustrates an exemplary architecture of an information processing system 400 configured for email protection using email signatures based on signing tokens in an illustrative embodiment. In the example of FIG. 4, the information processing system 400 comprises an email client 405, a token generator 410, one or more signing tokens 415, a signing token store 420, a signing orchestrator 440, one or more signing keys 442, a signing key store 445, a salt generator 450 (e.g., a positional salt generator), a positional salt store 455, a message scrambler 460 that uses the positional salt, a hash generator 470 that generates a hash value for a scrambled message, and a hash value store 480. The distributed signing information stores 108 of FIG. 1 may comprise, for example, one or more of the signing token store 420, the positional salt store 455 and the hash value store 480.

In at least some embodiments, the email client 405 comprises an email client send part 405-S and an email client receive part 405-R, discussed further below. The email client send part 405-S and/or the email client receive part 405-R may be implemented as plugins to an email client to obtain the signing key of the user for each email being sent, or the signing key may be cached by the email client 405 itself.

The email client send part 405-S orchestrates the process flow at the client side, as discussed further below in conjunction with FIGS. 6 and 7. In at least some embodiments, the email client send part 405-S has awareness of the signing key 442, but no other knowledge of the signing token 415, the hashing aspects or the positional salt, for example. Depending on the settings, even the signing key 442 may not be saved in the email client send part 405-S and the users may be prompted to enter the signing key 442 each time they want to sign an email. In the case of automatically signing emails, the signing key 442 may be encrypted and saved on the client side. This is done for the convenience of the end-user and is not necessary for the functioning of the disclosed email protection techniques. Technically, all calls to the signing orchestrator 440 can directly be made using mail server hooks (if the user is authenticated), thereby eliminating the need for an email client send part 405-S and making the disclosed email protection techniques transparent to the user. In at least some embodiments, the email client send part 405-S is only required if no mail server changes can be made. For organizations where mail server send hooks can be altered, the email client send part 405-S may be moot.

The email client receive part 405-R orchestrates all flow at the recipient side, as discussed further below in conjunction with FIGS. 8 and 9. The email client receive part 405-R validates the received email and visually highlights whether the email is safe or not, following a verification process. Again, the email client receive part 405-R is optional in some embodiments and in cases where the received email can trigger hooks on the email server, visual cues can be directly embedded in the email footer at the server level, as would be apparent to a person of ordinary skill in the art.

The token generator 410 generates one or more signing tokens 415 for use in accordance with the disclosed email protection techniques. Signing tokens 415 are randomly generated by the token generator 410 for email users. In some embodiments, signing tokens 415 are prime numbers mixed with random characters. The signing tokens 415 are mapped to each user in an organization, for example. A signing token 415 is a single symmetric key. The signing tokens 415 can be changed over time.

In some embodiments, the signing tokens 415 may be shuffled and/or randomly changed from time to time, for example, without the users even being informed that the signing tokens 415 have been changed. At any given time, any employee in the organization might have one signing token 415 that the employee may not be aware of (e.g., zero knowledge about the existence of this signing tokens 415 is provided to the email client 405, the user associated with the signing token 415 or the recipient of the email). In one or more embodiments, the signing tokens 415 are multiple-part keys with a minimum of two different parts (e.g., with three parts) separated, for example, by a dash ("-"). For example, a three-part signing token 415 may comprise 46cb80512e9d-c6ff41e2e4fb391105d0ae317a45-fa31fb1911629af38f89cb30. As noted above, the signing tokens 415 may be stored in the signing token store 420.

The signing keys 442 comprise secondary keys that can be used to trigger a signature using the signing token 415 described above, in a similar manner as a password. Users may be aware of the signing keys 442 in embodiments where the signing keys 442 are manually entered for each email being sent. Otherwise, this signing key may be generated randomly and directly pulled by the email client 405 after the user is authenticated by the email server 110. The signing keys 442 may be stored, for example, in the signing key store 445.

In at least some embodiments, the signing orchestrator 440 initiates each part of the multi-part signing token 415 from the signing token store 420 being inserted in the respective part in one of the three random positions of the email identified by the positional salt, discussed hereinafter. As discussed above in conjunction with FIG. 3, the signing orchestrator 440 may comprise an email signing module 310, an email verification module 320 and an orchestration database 330. The functionality of the email signing module 310 will be discussed further below in conjunction with FIGS. 6 and 7. The functionality of the email verification module 320 will be discussed further below in conjunction with FIGS. 8 and 9.

The salt generator 450 (e.g., a positional salt generator) generates email positions where respective parts of a multi-part signing token 415 will be inserted. The multi-part signing token 415 is broken into each part before it is embedded in the randomly generated positions inside the email before a hash generation is performed. This is done in some embodiments to salt the hash value in a way that an impersonator cannot generate the hash value from the email. The salt generator 450 takes the length (e.g., a character count) of the email and generates three random numbers that are equal to, or less than, the character count. These numbers are passed to the signing orchestrator 440, which takes each part of the multi-part signing token 415 and punches in the respective part at the three random positions (identified by the generated three random numbers), as discussed further below. The positional salt values generated by the salt generator 450 may be stored in the positional salt store 455.

The message scrambler 460 may take each part of the multi-part signing token 415 from the signing token store 420 and insert the respective part in one of the three random positions of the email identified by the positional salt to generate a scrambled message. The hash generator 470 applies a hash function to the scrambled message to generate a hash value and the hash value may be stored in the hash value store 480. The term "hash function" as used herein shall be broadly construed to encompass any function or operation that when applied to a given message generates a message-dependent value that changes for any change to the given message.

FIG. 5 is a process diagram illustrating an exemplary implementation of a user email configuration process 500 in an illustrative embodiment. In the example of FIG. 5, an administrator assigns a signing key to each user, for example, as each user is onboarded into an organization, and stores the assigned signing key in the signing key store 445 for each respective user. In addition, the token generator 410 generates a multi-part signing token 415 for each user and stores the respective multi-part signing token 415 in the signing token store 420.

Figure 6:
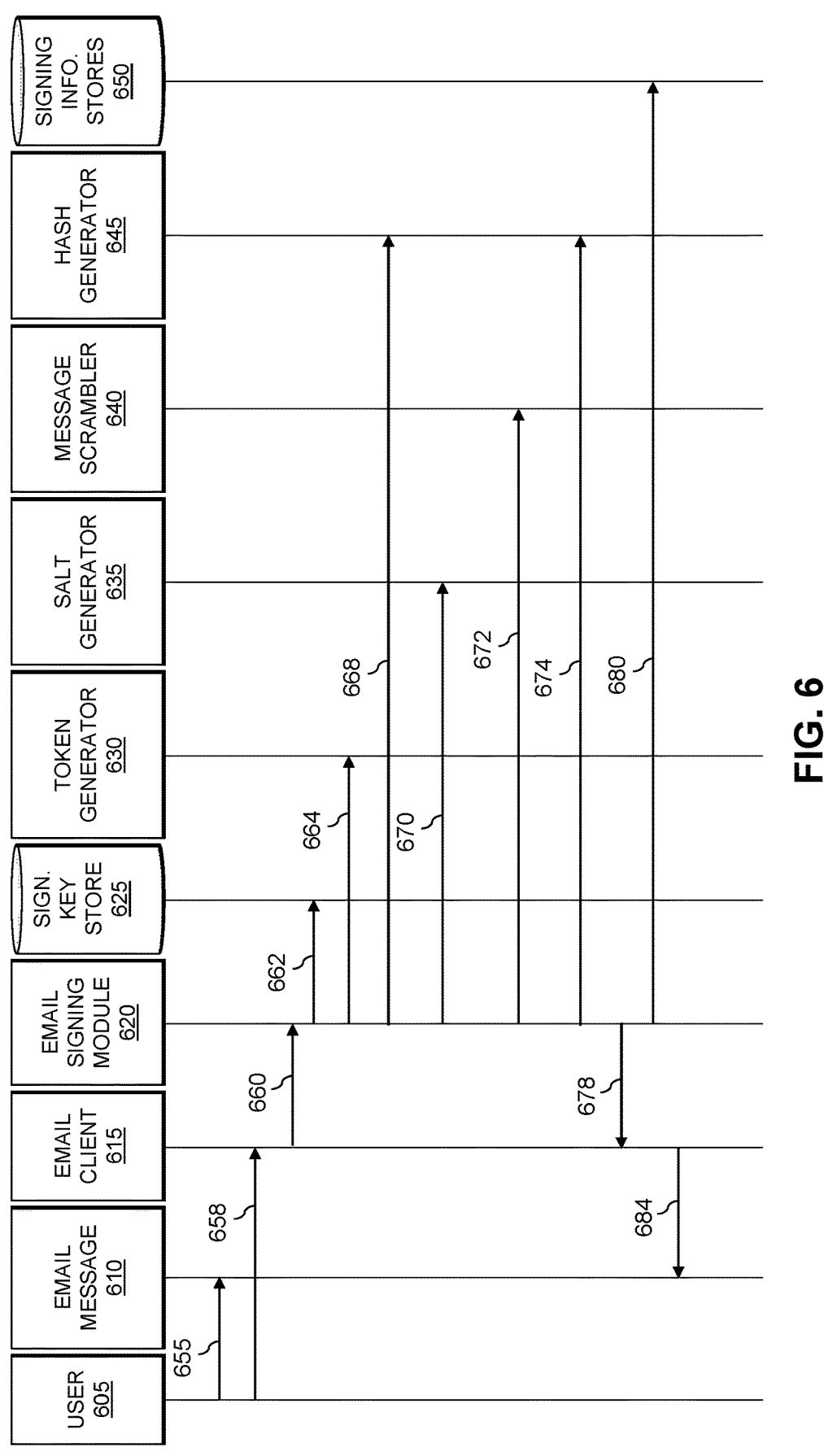
FIG. 6 is a communication diagram illustrating an email protection process performed for an email that is being sent in accordance with an illustrative embodiment.

FIG. 6 is a communication diagram illustrating an email protection process performed for an email that is being sent in accordance with an illustrative embodiment. In the example of FIG. 6, a user 605 begins to write an email message 610 in step 655. In step 658, the user completes the email message 610 and hits the send button associated with the email application. The email client 615, such as the email client send part 405-S, requests the email signing module 620 of the signing orchestrator 440 in step 660 to sign the email message 610. The email signing module 620, in step 662, obtains the signing key 442 of the user 605, for example, from the signing key store 625 and verifies the signing key 442 entered by the user 605. In addition, in step 664, the email signing module 620 requests the token generator 630 to generate (or retrieve) a signing token 415 for the email message 610. In step 668, the email signing module 620 requests the hash generator 645 to generate a first hash value of the email message 610.

The email signing module 620, in step 670, requests the salt generator 635 to generate the positional salt values. The email signing module 620 may store the generated signing token 415 and the generated positional salt values in the orchestration database 330. In step 672, the email signing module 620 requests the message scrambler 640 to generate a scrambled message using the email message 610, the generated signing token 415 and the generated positional salt values (e.g., by placing the respective part of the generated signing token 415 in the corresponding position of the email message 610 identified by the generated positional salt values).

In step 674, the email signing module 620 requests the hash generator 645 to generate a second hash value of the scrambled message. The email signing module 620, in step 678, sends the second hash value to the email client 615. In step 680, the email signing module 620 stores the generated signing token, the first hash value (as a key), the second hash and the positional salt values associated with the email being sent to the respective portions of the signing information stores 650 (for example, using different signing information stores and/or different application programming interfaces (APIs)).

The email client 615, in step 684, appends the second hash value in the header portion of the email message 610.

FIG. 7 is a process diagram illustrating an exemplary implementation of an email protection process 700 performed for an email that is being sent in an illustrative embodiment. In the example of FIG. 7, a user initially composes an email and hits the send button using an email application. The email client send part 405-S obtains the email and then requests the signing orchestrator 440 to sign the composed email. In some embodiments, the request to sign the composed email may be performed automatically upon the user completing the email, or may be initiated only when specifically requested by the user (for example, by hitting a "sign email" button).

In response to the request from the email client send part 405-S, the email signing module 310 portion of the signing orchestrator 440 obtains and validates the signing key of the user. For example, the signing key of the user may be entered by the user or obtained from the email client 405 (e.g., using a plugin) or a client-based password manager deployed by the organization, at the time the email is composed, and then compared to a signing key previously stored in the signing key store 445. In response to a validation of the signing key of the user, the email signing module 310 obtains the signing token 415 of the user, for example, from the signing token store 420. The email signing module 310 also requests the hash generator 470 to generate a first hash value of the original email and requests the salt generator 450 to generate positional salt for the original email, as discussed above. The email signing module 310 stores the signing token 415 of the user and the generated positional salt, for example, in the orchestration database 330.

The email signing module 310 then generates a scrambled email by placing the respective parts of the signing token 415 in the positions of the original email identified by the positional salt. The email signing module 310 then requests the hash generator 470 to generate a second hash value of the scrambled email and sends the second hash value to the email client send part 405-S. The email signing module 310 stores the signing token 415, the first hash value (as a key), the second hash value and the positional salt in the distributed signing information store 108. Finally, the email client send part 405-S appends the second hash value in the header portion, for example, of the composed email and sends the updated email to one or more designated recipients.

Figure 8:
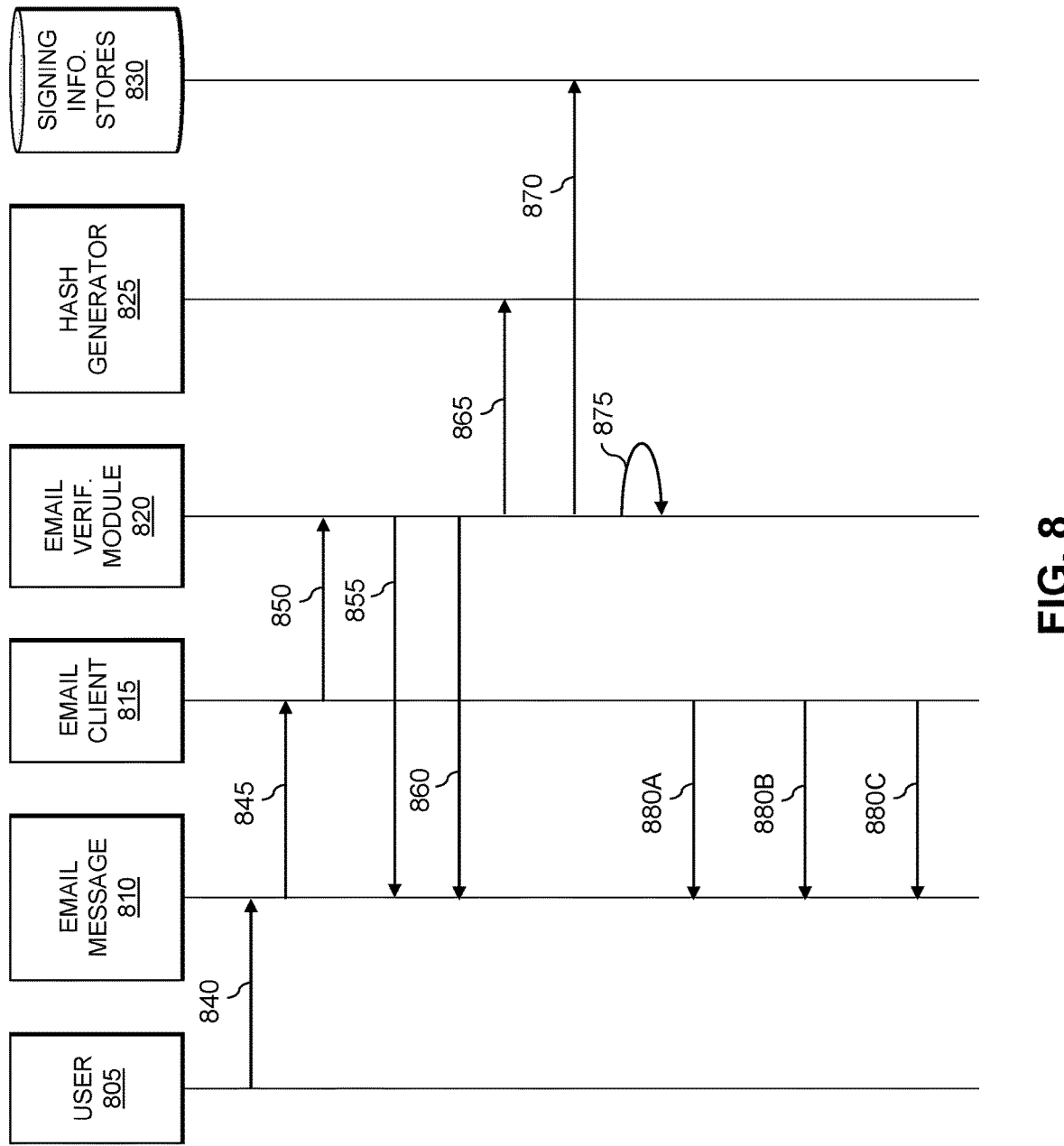
FIG. 8 is a communication diagram illustrating an email verification process for processing a received email in accordance with an illustrative embodiment.

FIG. 8 is a communication diagram illustrating an email verification process for processing a received email in accordance with an illustrative embodiment. In the example of FIG. 8, a user 805 attempts to read an email message 810 in step 840. In step 845, the email client 815, such as the email client receive part 405-R, automatically opens the email message 810 (for example, when an automatic verification mode has been configured) and requests the email verification module 820 of the signing orchestrator 440 in step 850 to verify the email message 810.

The email verification module 820 reads the second hash value that was appended in the header portion of the email message 810 (for example, using the techniques described above in conjunction with FIG. 6) in step 855, and reads the full email message 810 in step 860. In step 865, the email verification module 820 requests the hash generator 825 to generate a third hash value of the email message 810.

In addition, in step 870, the email verification module 820 uses the third hash value as a key to obtain the signing token, the first hash value (used as a key upon storage), the stored second hash and the positional salt values associated with the email that was sent from the respective portions of the signing information stores 830. In step 875, the email verification module 820 compares the second hash value retrieved from the email header in step 855 to the second hash value retrieved from the signing information stores 830 in step 870. In another variation, the email verification module 820 may compare the second hash value retrieved from the email header in step 855 in step 870 to a fourth hash value (sometimes referred to herein as a comparison value) generated by applying the hash function to a regenerated version of the original email (e.g., email message 610 drafted by the sending user 605) embedded with the respective portions of the signing token of the email sender in the positions identified by the positional salt.

If the comparison performed in step 875 reveals that the two compared hash values do not match, then any links included in the email message 810 may be disabled (e.g., removed) in step 880A and a visual warning (or another indicator) may be provided to the user 805 (for example, in the email message 810 before it is presented to the user 805). In addition, the email message 810 may optionally be quarantined in step 880B.

If the comparison performed in step 875 reveals that the two compared hash values match one another, then the email message 810 may be presented to the user 805 in step 880C without any error or warning indications.

FIG. 9 is a process diagram illustrating an exemplary implementation of an email verification process 900 for processing a received email in an illustrative embodiment. In the example of FIG. 9, an email client receive part 405-R initially receives an updated email with a second hash value in the header portion (e.g., a second hash value inserted in the header portion by the email protection process 700 of FIG. 7). The email client receive part 405-R then requests the signing orchestrator 440 to verify the email.

The email verification module 320 reads the second hash value from the header portion of the email and requests the hash generator 470 to generate a third hash value of the updated email. In addition, the email verification module 320 uses the third hash value as a key to obtain the signing token 415, the first hash value, the second hash value and the positional salt from the distributed signing information store 108. The email verification module 320 compares the second hash value from the received header portion with the second hash value obtained from the distributed signing information store 108. In one variation, the email verification module

320 may compare the second hash value retrieved from the header portion of the updated email to a fourth hash value generated by applying the hash function to a regenerated version of the original email (e.g., the email message drafted by the sending user embedded with the respective portions of the signing token of the email sender in the positions identified by the positional salt). Finally, the email client receive part 405-R delivers the updated email to the recipient user or implements mitigation techniques based on a result of the comparison. For example, the mitigation techniques may comprise disabling (or removing) any links included in the updated email and/or providing a visual warning (or another indicator) to the recipient user (for example, in the updated email before it is presented to the recipient user).

Consider a first user that is authoring an email to a second user to discuss a specific problem. The organization associated with the first user has configured the email account of the first user such that all emails are automatically signed using the disclosed email protection techniques. When the email arrives to the inbox of the second user, the email will have a green indicator, for example, (or another indication) that will certify that the email was sent from the first user; the email has not been spoofed by an attacker; and the email has not been tampered with. The second user may also click on a verify link on the email plugin in the second user's computer in some embodiments that will show the information for the first user as it is stored in a corporate LDAP (Lightweight Directory Access Protocol) active directory or another source of distributed directory information.

Now consider that the email from the first user that that was sent to the second user was intercepted, spoofed, and tampered with prior to a delivery to the second user (for example, a phishing link may have been inserted in the email). As soon as the second user receives the email, the second user gets a visual alert (or another indicator) that the email may have been tampered with (and should not be trusted) since the email fails the validation process of FIGS. 8 and 9. In addition, any hyperlinks in the received email may be disabled. For example, the email may have been spoofed using a man-in-the-browser or man-in-the-client attack and the intended contents of the header has been changed from "Connect and Heal" to merely "Connec.t" The minor modification in the email causes the hash validation to fail, resulting in the visual warning mentioned above and also the removal and/or deactivation of any hyperlink elements from the mail body (optionally, replacing the hyperlink labels with relevant messages and a strike through which visually indicates to the second user that the links are disabled).

Consider another example, where the identity of the first user is spoofed by a third user using an open SMTP (Simple Mail Transfer Protocol) server. The third user drafts an email using the "from address" of the first user and sends the email to the second user with a hyperlink. This may be done using potentially unreliable technology and an open SMTP server setup by the attacker (third user) explicitly for this purpose. The email passes through all organizational checks and reaches the mailbox of the second user, where the email plugin examines that the email was sent by the first user who is supposed to be using email signatures in accordance with the present disclosure and since this email is not signed the disclosed email protection techniques automatically remove hyperlinks in the email using the plugin. Even if the attacker tries to sign the message by breaking in and finding out the hashing algorithm used, the attacker can only hash the email body. The multi-part key, the locational salt, and its location for that specific instance of the email are all missing and therefore the verification will fail. Apart from the email body, no additional knowledge about the signature is provided on the client side.

In another example, a company may try to create an address that looks like it is generated from by a trusted source with a phishing link embedded in the email. Since the email is not signed with the proper token, the disclosed email protection techniques automatically provide an indication in the email to warn the recipient user before the recipient user even opens the email. Even if the hacker has managed to fully spoof the email address of the trusted source and hack their email using the email server, the hacker still does not have access to the email application instance installed on the user's device and the signing key and hence any email they send, even if it is allegedly sent from the trusted email account, using proper credentials will not be signed and hence will be flagged with a warning.

FIG. 10 is a flow diagram illustrating an exemplary implementation of a process for email protection using email signatures based on signing tokens, according to an embodiment. In the example of FIG. 10, a signed email sent by at least one sending processing device of an email sender is obtained in step 1002. A first hash value generated using the source email (e.g., by applying at least one hash function to the source email) is used as a key to at least one data record. The signed email comprises a second hash value as an email signature, and the second hash value is (i) generated using (e.g., by applying at least one hash function to) the source email embedded with at least a portion of a signing token of the email sender and (ii) stored in the at least one data record of the at least one storage device.

The second hash value is obtained from the signed email in step 1004. The second hash value obtained from the signed email is compared in step 1006 to: (i) a copy of the second hash value obtained from the at least one data record (e.g., using a third hash value, as described herein) and/or (ii) a comparison value (e.g., a fourth hash value, as described herein) determined using a regenerated version of the source email embedded with the at least the portion of the signing token of the email sender. A delivery of the signed email to at least one email recipient is automatically controlled in step 1008 based at least in part on a result of the comparison.

In some embodiments, the copy of the second hash value obtained from the at least one data record is obtained using a third hash value, generated using the signed email, as a key to access the at least one data record. The signing token of the email sender may comprise a multi-part signing token of the email sender and the second hash value may be generated by applying the at least one hash function to the source email embedded with at least a first part of the multi-part signing token in a first position of the source email and with at least a second part of the multi-part signing token in a second position of the source email. The first position and the second position of the source email may be determined by a hardware-based salt generator (e.g., the salt generator 635 of FIG. 6). The at least one data record may further comprise the multi-part signing token of the email sender, the second hash value and information characterizing the first position and/or the second position of the source email. Two or more of the multi-part signing token of the email sender, the first hash value, the second hash value and the information characterizing the first position and the second position of the source email may be stored using at least two distinct distributed storages device (e.g., the signing information stores 650 of FIG. 6).

In at least one embodiment, the third hash value is generated by a hardware-based hash generator (e.g., the hash generator 645 of FIG. 6) that applies the at least one hash function to the received signed email.

In one or more embodiments, the regenerated version of the source email embedded with the at least the portion of the signing token of the email sender may be regenerated by: (a) obtaining the at least the portion of the signing token of the email sender from the at least one data record using a third hash value, generated using the signed email, as a key to access the at least one data record, and (b) using the obtained at least the portion of the signing token of the email sender to generate the regenerated version of the source email embedded with the at least the portion of the signing token of the email sender. The at least one email recipient may be automatically notified and/or one or more hyperlinks may be disabled based at least in part on the result of the comparison indicating that the second hash value obtained from the signed email was not verified.

The particular processing operations and other network functionality described in conjunction with FIGS. 4 through 10, for example, are presented by way of illustrative example only, and should not be construed as limiting the scope of the disclosure in any way. Alternative embodiments can use other types of processing operations to provide functionality for email protection using email signatures based on signing tokens. For example, the ordering of the process steps may be varied in other embodiments, or certain steps may be performed concurrently with one another rather than serially. In one aspect, the process can skip one or more of the actions. In other aspects, one or more of the actions are performed simultaneously. In some aspects, additional actions can be performed.

In at least some embodiments, the disclosed techniques for email protection using email signatures based on signing tokens permit the senders of received emails to be verified and also verify the authenticity of emails (e.g., that the email content has not been tampered with). An organization can automatically enroll users as being authentic employees who will not engage in the acts of spoofing or phishing, in a similar manner as a certificate authority. The email clients of email senders can be configured in a way that each sent email is signed automatically in some embodiments using the disclosed signing tokens without any action required of the sending users. In addition, email clients of email recipients can be configured in a manner that received emails signed by such signing tokens are automatically verified for spoofing and phishing attacks without any action required of the recipient users.

Among other benefits, an organization can implement the disclosed techniques for email protection using email signatures based on signing tokens with policies for managing, changing and refreshing the signing tokens, for example. After making minimal changes to an email server (or providing an email plugin where changes to the email server are not possible), the users of an organization can be configured in such a way that they can continue to use a preferred email client using the existing flow. Each sent email can be automatically signed and each email received from other users can be automatically verified. In this manner, suspicious emails can be automatically detected and links within such suspicious emails can be automatically disabled or removed. In addition, a visual representation (or another indicator) of the suspicious email can be provided to the one or more email recipients.

It is to be appreciated that the particular advantages described above and elsewhere herein are associated with particular illustrative embodiments and need not be present in other embodiments. Also, the particular types of information processing system features and functionality as illustrated in the drawings and described above are exemplary only, and numerous other arrangements may be used in other embodiments.

Illustrative embodiments of processing platforms utilized to implement functionality for email protection using email signatures based on signing tokens will now be described in greater detail with reference to FIGS. 11 and 12. Although described in the context of information processing system 100, these platforms may also be used to implement at least portions of other information processing systems in other embodiments.

Figure 11:
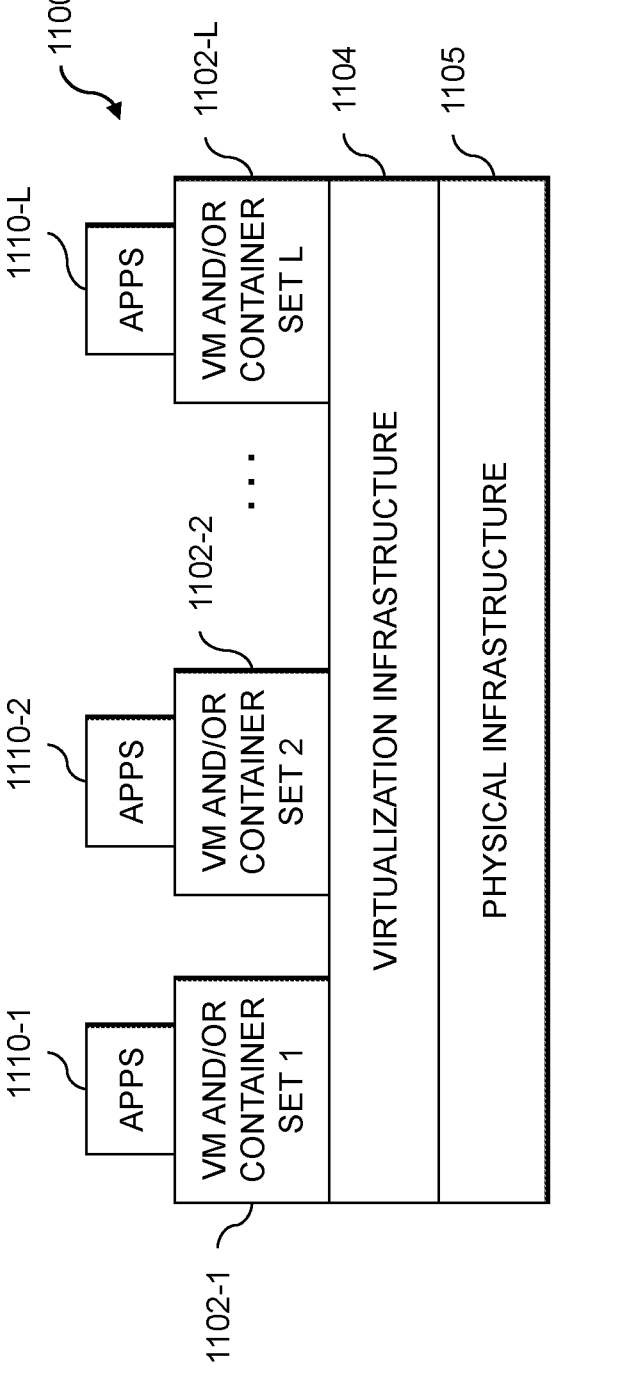
FIGS. 11 and 12 show examples of processing platforms that may be utilized to implement at least a portion of an information processing system in illustrative embodiments.
Figure 12:
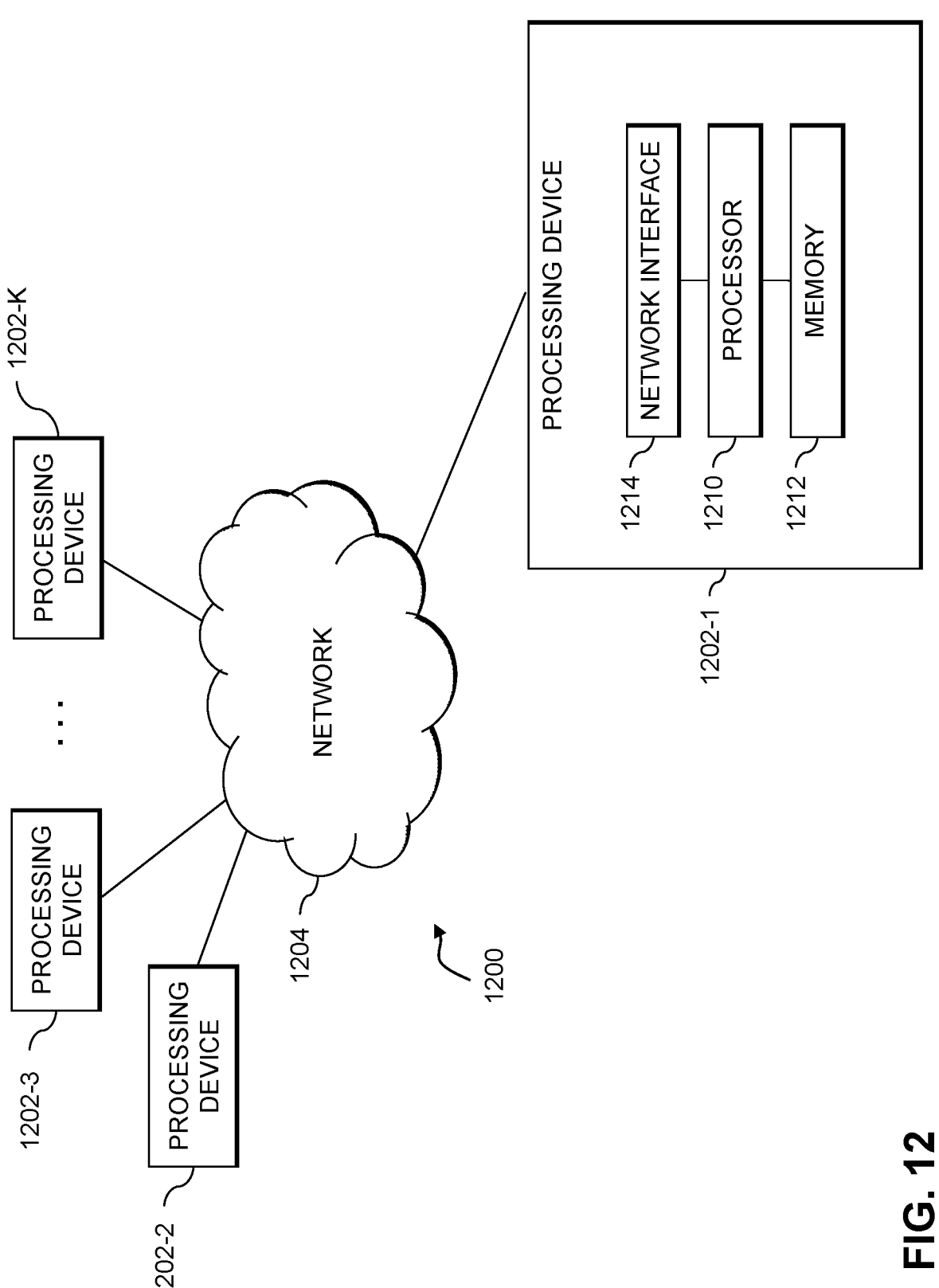

FIG. 11 shows an example processing platform comprising cloud infrastructure 1100. The cloud infrastructure 1100 comprises a combination of physical and virtual processing resources that may be utilized to implement at least a portion of the information processing system 100 in FIG. 1. The cloud infrastructure 1100 comprises multiple virtual machines (VMs) and/or container sets 1102-1, 1102-2, . . . 1102-L implemented using virtualization infrastructure 1104. The virtualization infrastructure 1104 runs on physical infrastructure 1105, and illustratively comprises one or more hypervisors and/or operating system level virtualization infrastructure. The operating system level virtualization infrastructure illustratively comprises kernel control groups of a Linux operating system or other type of operating system.

The cloud infrastructure 1100 further comprises sets of applications 1110-1, 1110-2, . . . 1110-L running on respective ones of the VMs/container sets 1102-1, 1102-2, . . . 1102-L under the control of the virtualization infrastructure 1104. The VMs/container sets 1102 may comprise respective VMs, respective sets of one or more containers, or respective sets of one or more containers running in VMs.

In some implementations of the FIG. 11 embodiment, the VMs/container sets 1102 comprise respective VMs implemented using virtualization infrastructure 1104 that comprises at least one hypervisor. A hypervisor platform may be used to implement a hypervisor within the virtualization infrastructure 1104, where the hypervisor platform has an associated virtual infrastructure management system. The underlying physical machines may comprise one or more distributed processing platforms that include one or more storage systems.

In other implementations of the FIG. 11 embodiment, the VMs/container sets 1102 comprise respective containers implemented using virtualization infrastructure 1104 that provides operating system level virtualization functionality, such as support for Docker containers running on bare metal hosts, or Docker containers running on VMs. The containers are illustratively implemented using respective kernel control groups of the operating system.

As is apparent from the above, one or more of the processing modules or other components of information processing system 100 may each run on a computer, server, storage device or other processing platform element. A given such element may be viewed as an example of what is more generally referred to herein as a "processing device." The cloud infrastructure 1100 shown in FIG. 11 may represent at least a portion of one processing platform. Another example of such a processing platform is processing platform 1200 shown in FIG. 12.

The processing platform 1200 in this embodiment comprises a portion of information processing system 100 and includes a plurality of processing devices, denoted 1202-1, 1202-2, 1202-3, . . . 1202-K, which communicate with one another over a network 1204.

The network 1204 may comprise any type of network, including by way of example a global computer network such as the Internet, a WAN, a LAN, a satellite network, a telephone or cable network, a cellular network, a wireless network such as a WiFi or WiMAX network, or various portions or combinations of these and other types of networks.

The processing device 1202-1 in the processing platform 1200 comprises a processor 1210 coupled to a memory 1212.

The processor 1210 may comprise a microprocessor, a microcontroller, an application-specific integrated circuit (ASIC), a field-programmable gate array (FPGA), a central processing unit (CPU), a graphical processing unit (GPU), a tensor processing unit (TPU), a video processing unit (VPU) or other type of processing circuitry, as well as portions or combinations of such circuitry elements.

The memory 1212 may comprise random access memory (RAM), read-only memory (ROM), flash memory or other types of memory, in any combination. The memory 1212 and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM, flash memory or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 1202-1 is network interface circuitry 1214, which is used to interface the processing device with the network 1204 and other system components, and may comprise conventional transceivers.

The other processing devices 1202 of the processing platform 1200 are assumed to be configured in a manner similar to that shown for processing device 1202-1 in the figure.

Again, the particular processing platform 1200 shown in the figure is presented by way of example only, and information processing system 100 may include additional or alternative processing platforms, as well as numerous distinct processing platforms in any combination, with each such platform comprising one or more computers, servers, storage devices or other processing devices.

For example, other processing platforms used to implement illustrative embodiments can comprise converged infrastructure.

It should therefore be understood that in other embodiments different arrangements of additional or alternative elements may be used. At least a subset of these elements may be collectively implemented on a common processing platform, or each such element may be implemented on a separate processing platform.

As indicated previously, components of an information processing system as disclosed herein can be implemented at least in part in the form of one or more software programs stored in memory and executed by a processor of a processing device. For example, at least portions of the functionality for email protection using email signatures based on signing tokens as disclosed herein are illustratively implemented in the form of software running on one or more processing devices.

It should again be emphasized that the above-described embodiments are presented for purposes of illustration only. Many variations and other alternative embodiments may be used. For example, the disclosed techniques are applicable to a wide variety of other types of information processing systems. Also, the particular configurations of system and device elements and associated processing operations illustratively shown in the drawings can be varied in other embodiments. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. A method, comprising:

obtaining a signed email sent by at least one sending processing device of an email sender, wherein the signed email is based at least in part on a source email, wherein a first hash value generated using the source email is used as a key to at least one data record, wherein the signed email comprises a second hash value as an email signature, and wherein the second hash value is (i) generated using the source email embedded with at least a portion of a signing token of the email sender and (ii) stored in the at least one data record;

obtaining the second hash value from the signed email;

comparing the second hash value obtained from the signed email to one or more of: (i) a copy of the second hash value obtained from the at least one data record and (ii) a comparison value determined using a regenerated version of the source email embedded with the at least the portion of the signing token of the email sender; and automatically controlling a delivery of the signed email to at least one email recipient based at least in part on a result of the comparison;

wherein the method is performed by at least one processing device comprising a processor coupled to a memory.

2. The method of claim 1, wherein the copy of the second hash value obtained from the at least one data record is obtained using a third hash value, generated using the signed email, as a key to access the at least one data record.

3. The method of claim 1, wherein the signing token of the email sender comprises a multi-part signing token of the email sender and wherein the second hash value is generated by applying at least one hash function to the source email embedded with at least a first part of the multi-part signing token in a first position of the source email and with at least a second part of the multi-part signing token in a second position of the source email, wherein the first position and the second position of the source email are determined by a hardware-based salt generator.

4. The method of claim 3, wherein the at least one data record further comprises one or more of the multi-part signing token of the email sender, the second hash value and information characterizing the first position and the second position of the source email.

5. The method of claim 4, wherein at least two of: the multi-part signing token of the email sender, the first hash value, the second hash value and the information characterizing the first position and the second position of the source email are stored using at least two distinct distributed storage devices.

6. The method of claim 1, wherein the regenerated version of the source email embedded with the at least the portion of the signing token of the email sender is regenerated by: (a) obtaining the at least the portion of the signing token of the email sender from the at least one data record using a third hash value, generated using the signed email, as a key to access the at least one data record, and (b) using the obtained at least the portion of the signing token of the email sender to generate the regenerated version of the source email embedded with the at least the portion of the signing token of the email sender.

7. The method of claim 1, comprising one or more of automatically notifying the at least one email recipient and disabling one or more hyperlinks based at least in part on the result of the comparison indicating that the second hash value obtained from the signed email was not verified.

8. A non-transitory processor-readable storage medium having stored therein program code of one or more software programs, wherein the program code when executed by at least one processing device causes the at least one processing device to perform the following steps:

obtaining a signed email sent by at least one sending processing device of an email sender, wherein the signed email is based at least in part on a source email, wherein a first hash value generated using the source email is used as a key to at least one data record, wherein the signed email comprises a second hash value as an email signature, and wherein the second hash value is (i) generated using the source email embedded with at least a portion of a signing token of the email sender and (ii) stored in the at least one data record;

obtaining the second hash value from the signed email;

comparing the second hash value obtained from the signed email to one or more of: (i) a copy of the second hash value obtained from the at least one data record and (ii) a comparison value determined using a regenerated version of the source email embedded with the at least the portion of the signing token of the email sender; and automatically controlling a delivery of the signed email to at least one email recipient based at least in part on a result of the comparison.

9. The non-transitory processor-readable storage medium of claim 8, wherein the copy of the second hash value obtained from the at least one data record is obtained using a third hash value, generated using the signed email, as a key to access the at least one data record.

10. The non-transitory processor-readable storage medium of claim 8, wherein the signing token of the email sender comprises a multi-part signing token of the email sender and wherein the second hash value is generated by applying at least one hash function to the source email embedded with at least a first part of the multi-part signing token in a first position of the source email and with at least a second part of the multi-part signing token in a second position of the source email, wherein the first position and the second position of the source email are determined by a hardware-based salt generator.

11. The non-transitory processor-readable storage medium of claim 10, wherein the at least one data record further comprises one or more of the multi-part signing token of the email sender, the second hash value and information characterizing the first position and the second position of the source email.

12. The non-transitory processor-readable storage medium of claim 11, wherein at least two of: the multi-part signing token of the email sender, the first hash value, the second hash value and the information characterizing the first position and the second position of the source email are stored using at least two distinct distributed storage devices.

13. The non-transitory processor-readable storage medium of claim 8, wherein the regenerated version of the source email embedded with the at least the portion of the signing token of the email sender is regenerated by: (a) obtaining the at least the portion of the signing token of the email sender from the at least one data record using a third hash value, generated using the signed email, as a key to access the at least one data record, and (b) using the obtained at least the portion of the signing token of the email sender to generate the regenerated version of the source email embedded with the at least the portion of the signing token of the email sender.

14. The non-transitory processor-readable storage medium of claim 8, comprising one or more of automatically notifying the at least one email recipient and disabling one or more hyperlinks based at least in part on the result of the comparison indicating that the second hash value obtained from the signed email was not verified.

15. An apparatus comprising:

at least one processing device comprising a processor and a memory, wherein the processor is coupled to the memory;

the at least one processing device being configured to implement the following steps:

obtaining a signed email sent by at least one sending processing device of an email sender, wherein the signed email is based at least in part on a source email, wherein a first hash value generated using the source email is used as a key to at least one data record, wherein the signed email comprises a second hash value as an email signature, and wherein the second hash value is (i) generated using the source email embedded with at least a portion of a signing token of the email sender and (ii) stored in the at least one data record;

obtaining the second hash value from the signed email;

comparing the second hash value obtained from the signed email to one or more of: (i) a copy of the second hash value obtained from the at least one data record and (ii) a comparison value determined using a regenerated version of the source email embedded with the at least the portion of the signing token of the email sender; and automatically controlling a delivery of the signed email to at least one email recipient based at least in part on a result of the comparison.

16. The apparatus of claim 15, wherein the signing token of the email sender comprises a multi-part signing token of the email sender and wherein the second hash value is generated by applying at least one hash function to the source email embedded with at least a first part of the multi-part signing token in a first position of the source email and with at least a second part of the multi-part signing token in a second position of the source email, wherein the first position and the second position of the source email are determined by a hardware-based salt generator.

17. The apparatus of claim 16, wherein the at least one data record further comprises one or more of the multi-part signing token of the email sender, the second hash value and information characterizing the first position and the second position of the source email.

18. The apparatus of claim 17, wherein at least two of: the multi-part signing token of the email sender, the first hash value, the second hash value and the information characterizing the first position and the second position of the source email are stored using at least two distinct distributed storage devices.

19. The apparatus of claim 15, wherein the regenerated version of the source email embedded with the at least the portion of the signing token of the email sender is regenerated by: (a) obtaining the at least the portion of the signing token of the email sender from the at least one data record using a third hash value, generated using the signed email, as a key to access the at least one data record, and (b) using the obtained at least the portion of the signing token of the email sender to generate the regenerated version of the source email embedded with the at least the portion of the signing token of the email sender.

20. The apparatus of claim 15, comprising one or more of automatically notifying the at least one email recipient and disabling one or more hyperlinks based at least in part on the result of the comparison indicating that the second hash value obtained from the signed email was not verified.

* * * * *